Oct. 8, 1940.                H. C. EDDY                2,216,724
                     INDICATION AND CONTROL APPARATUS
                    Filed May 11, 1937        2 Sheets-Sheet 1
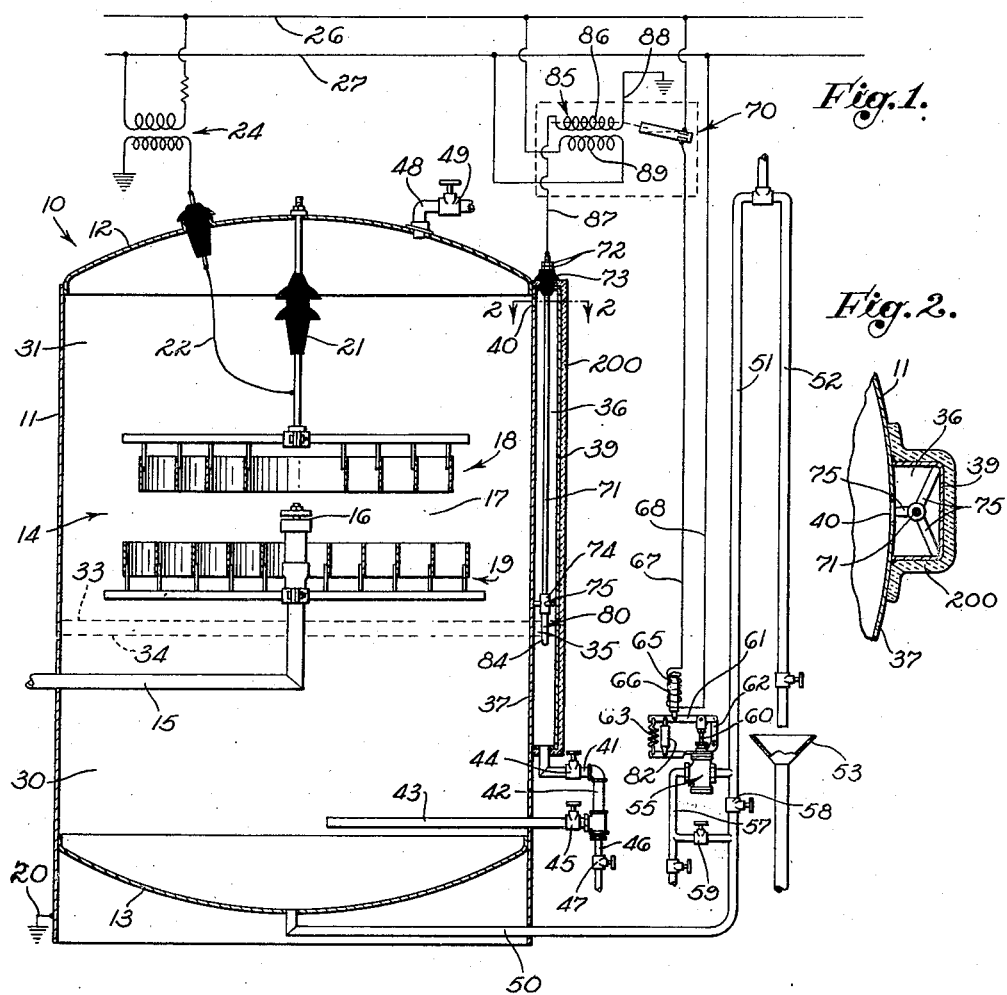
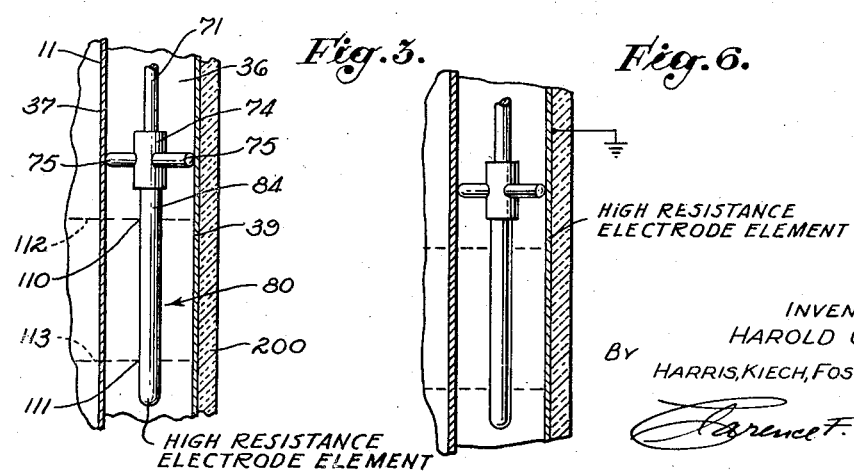
INVENTOR
HAROLD C. EDDY
By HARRIS, KIECH, FOSTER & HARRIS
Clarence F. Kiech
ATTORNEYS.

Oct. 8, 1940.   H. C. EDDY   2,216,724
INDICATION AND CONTROL APPARATUS
Filed May 11, 1937   2 Sheets-Sheet 2

INVENTOR
HAROLD C. EDDY
BY HARRIS, KIECH, FOSTER & HARRIS

ATTORNEYS.

Patented Oct. 8, 1940

2,216,724

UNITED STATES PATENT OFFICE 2,216,724

INDICATION AND CONTROL APPARATUS

Harold C. Eddy, Los Angeles, Calif., assignor by mesne assignments, to Petrolite Corporation, Ltd., Wilmington, Del., a corporation of Delaware Application May 11, 1937, Serial No. 142,075

4 Claims. (Cl. 137—68)

My invention relates to an apparatus for indicating and/or controlling, i. e., determining, the position of the surface of a body of liquid and, more particularly, to a system for controlling the water level in an electric dehydrator or in a tank containing one or more bodies of liquids.

It is an object of the present invention to provide an improved system for indicating and/or controlling the position of the surface of such a body of liquid.

It is often desirable to control the position of such a surface between limits and it is an object of the present invention to provide a novel electrical system for accomplishing this result.

Another object of the invention is to provide in such a system, when used for indication or control purposes, an electrode means contactible by the liquid as the surface rises, and so arranged that current will pass through the body of liquid, a relatively higher current flowing when the surface is higher than when the surface is lower.

It is a further object of the invention to provide, in a system for indicating or controlling the position of such a surface, an electrode structure which can be partially submerged at all times and yet be responsive to a change in position of the surface.

Another object is to provide a novel high resistance electrode in such an indication or control system.

With conventional level-control systems which operate electrically, it has been found that the control valve opens and closes several times a minute. This results in an undue amount of wear and short life and necessitates frequent servicing. It is an object of the present invention to provide a novel electrically-operated system in which the valve opens and closes at longer intervals of time.

It is another object of the invention to provide an electrical system in which the valve will not chatter. In this connection, the invention can use an actuating circuit for an electro-magnetic valve with a switch in this circuit controlled by the current flowing through the electrode circuit, and it is an object of the invention to provide such a system.

It is a further object to connect a first winding in the electrode circuit so that the resulting flux varies with the current in this circuit and to provide a system wherein this change in flux moves a member in response to these flux changes and which movable member may be used to indicate or control the position of the surface.

Another object is to provide a second winding inductively connected to said first winding to induce a potential in the first winding to send current through the electrode circuit.

The invention is applicable to various installations but is of particular utility in controlling the relative amounts of two liquids of different density present in a container. For instance, if the container retains bodies of oil and water, the invention can be used to indicate or control the relative amounts thereof in the container or to control the position of an interface therebetween. If the liquids in the container are undergoing gravitational separation, it is difficult to secure a clean interface suitable for indication or control purposes.

It is an object of the present invention to establish an auxiliary interface in a novelly-disposed space communicating at its upper end with the lighter liquid in the upper end of the container and communicating at its lower end with the heavier liquid in the lower end of the container.

When such an expedient is used in conjunction with a container retaining bodies of liquid existing at superatmospheric temperature, it has been found very desirable to correlate the temperature of the contents of the container and the temperature in such a space, and it is an object of the present invention to dispose such a space along one upright wall of the container in such manner that heat is transferred between the contents of the container and the liquid or liquids in such a space.

Further objects and advantages will be made evident hereinafter.

By way of example, the invention will be explained with reference to an electric dehydrator capable of resolving crude oil emulsions to separate the oil and water phases. It will be clear, however, that the invention finds utility in various other arts.

Referring to the drawings, Fig. 1 is a vertical sectional view of a dehydrator incorporating the invention.

Fig. 2 is a sectional view of the upright space taken on the line 2—2 of Fig. 1.

Fig. 3 is an enlarged view of the electrode structure shown in Fig. 1.

Fig. 6 is an enlarged view similar to Fig. 3 in which the high resistance electrode element is associated with the wall of the upright space.

Figure 4:
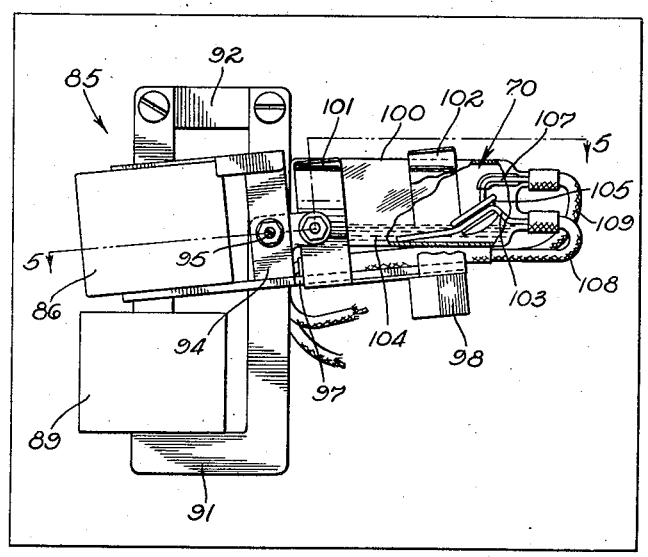
Fig. 4 is a side view of one type of switch means which can be used in conjunction with the invention.

Referring particularly to Fig. 1, there is illustrated a dehydrator 10 which may be of any type capable of resolving an emulsion and retain the oil and water phases under conditions conducive to gravitational separation. As shown, this dehydrator includes a tank or container 11 closed at its upper end by a dome 12 and at its lower end by a bottom wall 13 to provide a space 14 in which treatment and separation of the emulsion constituents may take place.

The emulsion enters through a pipe 15 and flows radially outward through a passage 16 through a high intensity electric field established in a treating space 17 between upper and lower electrode structures 18 and 19. The details of construction of these electrode structures are not per se a part of the present invention. Suffice it to say that the lower electrode structure 19 is electrically connected to the container 11 which is in turn grounded as indicated by the numeral 20. The upper electrode structure 18 is supported from an insulator 21 and energized by a conductor 22 connected to a high voltage secondary terminal of a transformer 24. The other high tension terminal is grounded and thus connected to the lower electrode structure 19. This transformer provides a primary winding connected across a supply line, including conductors 26 and 27.

The action of an electric field thus established is to coalesce the dispersed water droplets of the incoming emulsion into masses of sufficient size to gravitate from the oil. There will thus form, in the lower end of the container 11, a body of water indicated by the numeral 30, with a body of oil thereabove indicated by the numeral 31. The space 14 will thus contain two liquids of different density undergoing gravitational separation. The oil at the upper end of the container will be relatively pure and the water in the body 30 will be quite homogeneous. These bodies of oil and water will usually not separate at a definite interface due to the accumulation of a sludge layer therebetween. However, in operating such a dehydrator, it is very desirable to control the position of the surface of the body of water. It is not usually essential that the surface be maintained absolutely constant and the present invention contemplates, in one of its embodiments, a system for controlling the position of the surface of the body of water between upper and lower positions indicated by dotted lines 33 and 34. A change of two or three inches in the position of this surface is often permissible and distinctly advantageous in that the control valve will be operated at much less frequent intervals than if an attempt were made to very definitely control the surface to maintain it at a constant elevation.

It has previously been proposed to dispose an electrode in the space 14 to be contacted by the water when the surface thereof rises, this electrode being directly connected in circuit with a source of potential and an electro-magnetic valve controlling the withdrawal of water. I have found that the accumulation of a sludge layer in such a system often prevents the desired control and, in overcoming this difficulty, I utilize an auxiliary and relatively clean interface formed in an interfacial zone 35 of an upright space 36. This space is formed immediately adjacent an upright wall 37 of the container 11 and may be immediately inside or outside thereof. The latter embodiment is shown in Figs. 1 and 2 in which this space is provided by a channel 39 welded, or otherwise secured, to the upright wall 37.

The upper end of the space 36 communicates with the oil inside the container 11 through an opening 40, and the lower end of this space communicates with the body of water through pipes 41, 42 and 43 when valves 44 and 45 are opened. A pipe 46 permits flushing of the space 36 when a valve 47 is opened. It is desirable that this space be flushed out at periodic intervals. Usually, flushing every two or three days is sufficient.

Due to the open communication between the contents of the container 11 and the upper and lower ends of the space 36, this space will contain superimposed bodies of oil and water separating at a definite interface. This auxiliary interface will rise and fall with changes in the relative amounts of oil and water in the container, or with changes in the position of the surface of the water body in the space 14. This auxiliary interface thus represents the surface of a body of conducting liquid which can rise and fall in the space 36.

Assuming that emulsion is continuously introduced into the electric dehydrator 10, the position of this auxiliary interface can be changed by properly controlling the outflow of oil or water, or both. In the system shown, the oil is withdrawn continuously through a pipe 48, as controlled by a valve 49 and the water is withdrawn through a withdrawal means, including a pipe 50 communicating with a stand pipe 51 and a discharge pipe 52 which discharges into a funnel 53.

Associated with the withdrawal means is an electro-magnetic valve means 55 which is opened and closed in response to a rise and fall of the level of the water in the space 36. Such valve means may be connected directly in the pipe 50 or the pipe 51, but I prefer to position it in a by-pass line 57 disposed to by-pass a portion or all of the water around a valve 58, as controlled by the setting of valves 58 and 59.

Various types of electro-magnetic valves can be used in this capacity. The one disclosed includes a valve member associated with a stem 60 pivoted to an arm 61 which is in turn pivoted to a link 62 so that, when the outer end of the arm 61 is raised, the valve will open. A spring 63 normally retains the valve closed. An electro-magnetic means is utilized to raise the arm 61 and is shown diagrammatically as including an armature 65 which is raised when a winding 66 is energized. This solenoid winding is connected by conductors 67 and 68 to the line conductors 26 and 27 and a switch means 70 is disposed in the conductor 67.

Extending downward in the space 36 is a conductor, shown as a rod 71, which is preferably adjustable in vertical position by turning nuts 72 threaded thereto. It is insulated from the grounded walls bounding this space by a bushing 73 and by any suitable means acting to centralize the lower end thereof. Acting in this capacity is a head 74 carrying outward-extending members 75 formed of insulating material and acting to centralize the head 74 and an electrode structure 80 depending therefrom and electrically connected at its upper end to the rod 71.

If an ordinary electrode formed of conducting material is utilized in this capacity and maintained at a potential above ground, the solenoid winding 66 can be directly connected in the electrode circuit so that current will flow through the water, the electrode and the solenoid winding when the surface of the water first comes into contact with this electrode. In certain instances, and particularly on smaller dehydrators operating under pressure, it has been found that such a system will cause chattering or repeated operation of the electro-magnetic valve. When the valve snaps shut due to separation of the water from the electrode, a surge is set up inside the dehydrator which causes the surface of the water to immediately rise again and contact the electrode and thus reopen the valve. Various expedients have been tried in an attempt to overcome such surges and the detrimental effect thereof in causing a valve to open and close rapidly until the surge has died out. In the present invention, a dash pot 82 may be connected to the arm 61 to slow down the movement thereof and thus overcome this difficulty, at least partially, in the event that the electrode structure 80 is formed of the usual conducting material. Such a dash pot will also tend to prevent wire drawing of the valve 55 and will correspondingly increase the life thereof. Even then, however, such a combination may operate the valve 55 several times a minute and may thus be objectionable in many installations.

I prefer to overcome these difficulties arising from surging and too frequent operation of the valve by use of an electrode structure of novel design and connected by novel means to the electro-magnetic valve. In this connection, I prefer to use an electrode structure which will send through the water or other liquid contacting same, a current which is relatively larger when the surface is opposite an upper portion of the electrode structure than when this surface is opposite a lower portion thereof. There are various ways of forming such an electrode structure but the simplest and most satisfactory is to use a high resistance electrode depending from the head 74 and electrically connected at its upper end to the rod 71. Such a high resistance electrode is indicated in Figs. 1 and 3 by the numeral 84. It may be formed of various shapes but I have found it eminently satisfactory to use a rod formed of high resistance material and being several inches in length. A "Zircon" rod has been found quite satisfactory as has also a rod formed of carborundum. Electrodes formed of other high resistance material can also be utilized, keeping in mind that the resistance thereof should be correlated with the desired and permissible vertical movement of the surface of the water. By way of example, a ¾ inch diameter carborundum rod of a length of about 4 inches and having a resistance of 20,000 ohms at 230 volts A. C. has been found very satisfactory when a potential of 230 volts is applied thereto, and, in conjunction with a switch which makes and breaks the circuit at different positions in its closing and opening movements, e. g., a switch such as is shown in Figs. 4 and 5, will permit a rise and fall of about 2 inches before moving the valve means 55 from opened to closed position or vice versa.

Figure 5:
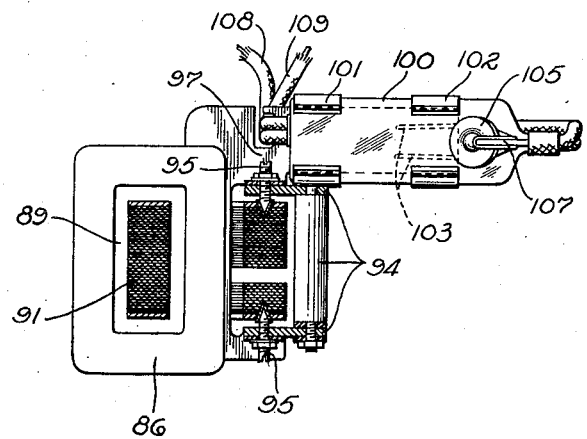
Fig. 5 is a sectional view taken on the line 5—5 of Fig. 4.

In such a system, I prefer to use a control means 85 constructed as best shown in Figs. 4 and 5 and connected as best shown in Fig. 1. This control means includes a first winding 86 and circuit means for connecting this winding in series circuit with the electrode structure 80 and the body of water in the space 36. As shown, the circuit means includes a conductor 87 connected to one terminal of the winding 86 and a conductor 88 connected to the other terminal and grounded so as to be electrically connected to the body of water in the space 36. Any suitable potential source may be utilized in this circuit. With the embodiment shown, the winding 86 itself acts as a potential source, potential being induced therein by a second winding 89 connected to the conductors 26 and 27. It will thus be clear that the rise of the level of the water in the space 36 will cause an increase in the amount of current flowing in this circuit.

I prefer to use this change in current in the electrode circuit to actuate the switch 70 and thus control the actuating circuit, including the solenoid winding 66, and thus vary the amount of water withdrawn. A convenient way of accomplishing this result is to use a control means shown in Figs. 4 and 5. A laminated core 91 is mounted to a suitable base in a manner not shown, and the second winding 89 surrounds one leg thereof. This winding thus sets up a flux which flows around the core 91. To increase the reluctance of this flux path, an upper portion 92 of the core may contain fewer laminations than the remaining portions.

Extending on opposite sides of the core 91 is a frame 94 pivoted thereto by pins 95. The first winding 86 is secured to this frame and surrounds the core 91 to the left of the pivot point, there being an arm 97 extending to the right of this pivot point. This structure thus forms a movable element which is, in effect, pivoted on the pins 95. It is so balanced by use of a weight 98 that it normally assumes the position shown in Fig. 4. When any current flows through the electrode circuit and thus through the winding 86, a resulting flux will be set up by this winding which will react with the flux developed by the magnetic means, including the winding 89, to set up a force tending to move the movable member. Preferably, the system is so constructed that current flowing through the winding 86 will cause repulsion between the windings 86 and 89 and move the frame in a clockwise direction about the pivot point. When using a high resistance electrode, the current in the electrode circuit will gradually increase as the surface of the water rises along the electrode. This will correspondingly increase the current through the winding 86 and increase the repulsive action so as to lower the arm 97 and raise the winding 86 more and more as the current increases. The position of the arm 97 can thus be used to indicate to the operator the position of the surface in the space 36.

Movement of the arm 97 can also be used to actuate the valve in the withdrawal means or may be otherwise connected to control the position of the surface of the water in the space 36. The present invention contemplates various means of operatively connecting such a movable element, as hereinbefore described, with the valve means 55. One of the most satisfactory methods of accomplishing this result is to mount the switch means 70 on the arm 97 so that the switch means closes when the arm moves downward to a predetermined position.

The preferred type of switch means 70 includes a mercury-contact switch, shown as comprising a glass tube 100 inclined relative to the arm 97 and secured thereto as by clips 101 and 102. This type of switch may include two conducting elements 103 sealed in the glass tube 100 to be normally in contact with a body of mercury 104. Retained in position by these conducting elements and positioned therebetween is an inclined cup member 105 formed of insulating material and adapted to retain a small pool of the mercury even when the switch means is in its position shown in Fig. 4. Dipping into this small pool of mercury is a downward-extending conducting element 107 also sealed in the tube 100, the conductor elements 103 and 107 being respectively connected to conductors 108 and 109 which form a part of the conductor 67 shown in Fig. 1.

When the switch is in the position shown in Fig. 4, there is insufficient mercury in the tube 100 to cover the lowermost lip of the inclined cup 105 so that the small pool of mercury therein is not in electrical contact with the main pool of mercury in the tube. However, when the arm 97 moves downward, more of the mercury will tend to flow into the right-hand end of the tube and the surface thereof will rise upward along the lowermost portion of the inclined cup 105. When a predetermined position is reached, the mercury in the main pool will flow over the lowermost lip of the inclined cup and thus bring the two pools of mercury into electrical contact to complete the circuit between the conductors 108 and 109. This will in turn energize the solenoid winding 66 from the supply line indicated by the conductors 26 and 27, thus causing the valve means 55 to open. Opening of this valve means starts or increases the flow of water from the container 11 and thus tends to lower the surface of the body of water in the space 36. If a high resistance electrode is used, a lowering of this surface will expose successive portions thereof and make available a greater portion of the high resistance electrode through which the current must move in order to reach and pass through the water. Thus, lowering of the surface will gradually decrease the current in the electrode circuit and will permit the movable member of the switch means 85 to gradually assume its biased position shown in Fig. 4. When this current has decreased a predetermined amount, the pools of mercury will become separated to break the circuit through the solenoid winding 66 and thus permit the valve means 55 to again close.

The action adjacent the high resistance electrode 84 can best be understood by reference to Fig. 3. It will be clear that current flowing in the electrode circuit must move through that portion of the high resistance electrode 84 above the surface of the body of water and must flow through the intervening water in order to reach the grounded walls of the space 36, for instance, the channel 39. In effect, such a high resistance electrode provides an upper portion 110 opposite the desired uppermost position of the surface of the water and a lower portion 111 opposite the desired lowermost position of the surface of the water, these desired maximum positions of the surface being indicated by the dotted lines 112 and 113 respectively. Thus, when the surface is opposite the line 112, a greater current will flow due to the fact that the current traverses only the small portion of the high resistance electrode above this line. The resistance thereof is greater than that of the water and the wall 39 bounding the space 36. This larger current will be sufficient to close the switch means 70. However, when the surface of the water drops to the level 113, that portion of the water between the lines 112 and 113 is no longer available to carry current and the current through the electrode circuit must pass through that portion of the high resistance electrode 84 above the line 113. The current in the electrode circuit is thus correspondingly smaller and, when the surface of the water drops opposite the lower portion 111 of the electrode, the mercury-contact switch will have moved sufficiently to interrupt the actuating circuit through the solenoid winding 66.

By proper design, the distance between the lines 112 and 113 can be made large or small. A distance up to or somewhat above 2 inches will be found quite satisfactory in dehydrator operation. By way of example, in one installation in which this distance is about 2 inches, the current through the electrode circuit was found to be 21 milliamperes when the surface of the water was at the upper desired position indicated by the dotted line 112, and was 17 milliamperes when the position of this surface was at the desired lower position indicated by the dotted line 113. This slight difference in current was sufficient to actuate the control means 85 to open and close the switch means 70.

It will be clear, however, that various other electrode structures fall within the scope of the present invention and can be utilized to send a relatively higher current to the control means 85 when the surface of the water is at its desired upper position than when the surface is at its desired lower position. It will further be clear that the high resistance element of the electrode circuit, which is successively shorted out by the rising water, can be either in the centrally-disposed electrode structure 80 or in the walls 39 of the space 36, following the teachings of Fig. 6. It is only necessary, if such a high resistance electrode is used, that a high resistance material bound one side of an upright space or passage in which the water or other conducting liquid can rise.

With such a system, in which the surface of the water rises and falls between predetermined limits, the valve means 55 will be actuated at less frequent intervals than if an attempt were made to more definitely control the position of the surface. In addition, the valve means 55 will not chatter or develop such surges as will cause the switch means 70 to open and close at quick intervals until the surge dies out. Thus, in such a system, the dash pot 82 can often be dispensed with, though its use will still serve the desirable function of preventing wire drawing of the valve due to the quick closing thereof.

If the electrode structure 80 is formed of a rod of metal having high conductivity, the level of the water will change over relatively narrow limits, for the valve 55 will open when the surface of the water first contacts such an electrode and will close when the surface drops therefrom. In such a system, the valve means 55 will operate more frequently and, to prevent the quick opening and closing of the valve due to surges, it is desirable to use the dash pot 82 which slows down the closing movement of the valve but not necessarily the opening movement thereof. This type of system can be used with success on certain installations, particularly in conjunction with the switch means 85.

It will be clear that the invention is not, in all instances, limited to the use of a space 36 separated from the contents of the container throughout its length except at the upper and lower ends thereof. In some instances where sludging tendencies are not serious, the electrode structure 80 can be extended downward in the main bodies of liquids in the container 11. For instance, in a large oil tank in which the water separates only very gradually, it is quite possible to extend the rod 71 and the electrode structure 80 downward through the body of oil so that the electrode structure will be contacted by the separated water as the surface thereof rises.

If such a space is used, it is very desirable that it be disposed in heat-transferring relationship with the contents of the container 11, and the system shown is advantageous in this regard. If liquids of superatmospheric temperature are present in the container, this will maintain a correlated temperature in the space 36 and thus be conducive to greater accuracy of control in view of the fact that the coefficients of expansion of oil and water are not identical. Further, heat applied to the space 36 reduces the viscosity of the oil and insures free flow thereof into and along this space. It also decreases the thickness of the film of oil which collects on the surface of the electrode 84 and forms a film which can readily be ruptured by contact with the water to complete or increase the current through the electrode circuit. If desired, the temperature between the contents of the space 36 and the container 11 may be better correlated by applying a heat-insulating coating to the external exposed walls bounding this space, as indicated by the layer of heat-insulating material applied to the channel 39 as indicated in Fig. 1 by the numeral 200.

It will be apparent that the level of the surface of the body of water can be controlled in various ways without departing from the spirit of the invention. For example, various means may be utilized for controlling the amount of water or other liquid withdrawn through the withdrawal means and for operatively connecting such a means to the electrode circuit.

It will also be clear that the invention is not limited to controlling the position of an interface between bodies of oil and water. The interface between other liquids of different density can be controlled without departing from the spirit of the invention so long as these liquids are of different conductivity.

Finally, it should not be understood that the invention is limited in utility to the control of position of an interface between two liquids. It can well be used to control the position of the surface of any body of conducting liquid, regardless of whether the medium thereabove is another liquid or gas, such as air. The invention can well be used to indicate or control the position of the surface of a body of water or other conducting or semi-conducting liquid in a tank or container in which air or other gas is above the liquid.

I claim as my invention:

1. In combination; an electrode structure formed of a high resistance non-metallic material; means for supporting said electrode structure to extend downward from an oil environment above an oil-water interface to a water environment below said interface; circuit means for sending current in series through that portion of said electrode structure above said interface and the body of water below said interface whereby the current in said circuit increases and decreases respectively as said interface rises and falls; and means associated with said circuit and movable in response to changes in said current which take place while the lower part of said electrode structure is in contact with said body of water whereby said means moves in response to changes in vertical position of said interface.

2. In combination in a device through which liquids flow, a system for controlling the vertical position of an interface formed between two liquids comprising contacting and superimposed bodies of water and oil, which system includes: an electrode structure comprising a rod of high resistance non-metallic material extending through said interface so as to be in contact with both said oil and said water; an electric circuit including a source of voltage, said water and said electrode being in series in said circuit whereby the current in said circuit changes as the vertical position of said interface changes while said electrode is in contact with said oil and water; movable means responsive to the current in said circuit; and means controlled by said last named means for regulating said flow to change the vertical position of said interface so as to maintain the same between predetermined vertical limits.

3. In combination in a device from which liquids comprising oil and water are discharged, a system for controlling the vertical position of an interface formed between contacting and superimposed bodies of said liquids, which system includes: an electrode structure of high resistance non-metallic material extending through said interface so as to be in contact with both said oil and water; an electric circuit including a source of voltage, said water and said electrode being in series in said circuit whereby the current in in series in said circuit changes as the vertical position of said interface changes while said electrode is in contact with said oil and water; movable means responsive to the current in said circuit; and means controlled by said last-named means for regulating the discharge of at least one of said liquids to change the position of said interface so as to maintain the same between predetermined vertical limits.

4. In combination in a device from which liquids comprising oil and water are discharged, a system for controlling the vertical position of an interface formed between contacting and superimposed bodies of said liquids, which system includes; an electrode structure of high resistance non-metallic material extending through said interface so as to be in contact with both said water and oil; an electric circuit including a source of voltage, said water and said electrode being in series in said circuit whereby the current in in series in said circuit changes as the vertical position of said interface changes while said electrode is in contact with said oil and water; movable means responsive to the current in said circuit and moving proportionally to changes in said current; and means controlled by said movable means for discharging one of said liquids when said movable means is in one position and for reducing said discharge when said last-named means reaches another position so as to maintain said interface between predetermined vertical limits.

HAROLD C. EDDY.